(12) United States Patent
Taniguchi et al.

(10) Patent No.: US 7,160,455 B2
(45) Date of Patent: Jan. 9, 2007

(54) HOLLOW FIBER MEMBRANE MODULE

(75) Inventors: Tohru Taniguchi, Fuji (JP); Yuzuru Ishibashi, Fuji (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 278 days.

(21) Appl. No.: 10/250,458

(22) PCT Filed: Oct. 31, 2002

(86) PCT No.: PCT/JP02/11352

§ 371 (c)(1),
(2), (4) Date: Aug. 11, 2003

(87) PCT Pub. No.: WO03/039720

PCT Pub. Date: May 15, 2003

(65) Prior Publication Data

US 2004/0178136 A1    Sep. 16, 2004

(30) Foreign Application Priority Data

Nov. 5, 2001   (JP)   ............................. 2001-339250

(51) Int. Cl.
*B01D 63/02* (2006.01)
*C02F 1/00* (2006.01)
*B01D 63/00* (2006.01)
*B01D 61/00* (2006.01)

(52) U.S. Cl. .................... 210/321.88; 210/321.79; 210/321.8; 210/321.89; 210/500.23; 210/650

(58) Field of Classification Search ............... None
See application file for complete search history.

(56) References Cited

U.S. PATENT DOCUMENTS

| 5,472,601 A | 12/1995 | Eguchi |
| 6,331,248 B1 | 12/2001 | Taniguchi et al. |

FOREIGN PATENT DOCUMENTS

| FR | 2 699 424 A1 | 6/1994 |
| JP | 61-19404 U | 2/1986 |
| JP | 61-93803 A | 5/1986 |
| JP | 61-141904 A | 6/1986 |
| JP | 63-171606 A | 7/1988 |
| JP | 6-296834 A | 10/1994 |
| JP | 7-47239 A | 2/1995 |
| JP | 7-148421 A | 6/1995 |
| JP | 8-229359 A | 9/1996 |
| JP | 11-300173 A | 11/1999 |
| JP | 2000-229225 A | 8/2000 |
| JP | 2001-252534 A | 9/2001 |

*Primary Examiner*—Krishnan S. Menon
(74) *Attorney, Agent, or Firm*—Birch, Stewart, Kolasch, & Birch, LLP

(57) ABSTRACT

A hollow fiber membrane module comprising a module housing, a hollow fiber membrane bundle comprising a plurality of hollow fiber membranes, at least one end portion of the bundle being fixed on the housing through a flexible potting material, and a rib or ring embedded in the potting portion, the rib or ring being fixed on an inner wall of the housing, and the rib or ring being embedded in the potting portion without directly contacting the hollow fiber membrane, and the filtration method using the same. The hollow fiber membrane module can maintain a practical pressure resistance.

11 Claims, 16 Drawing Sheets

F I G. 1
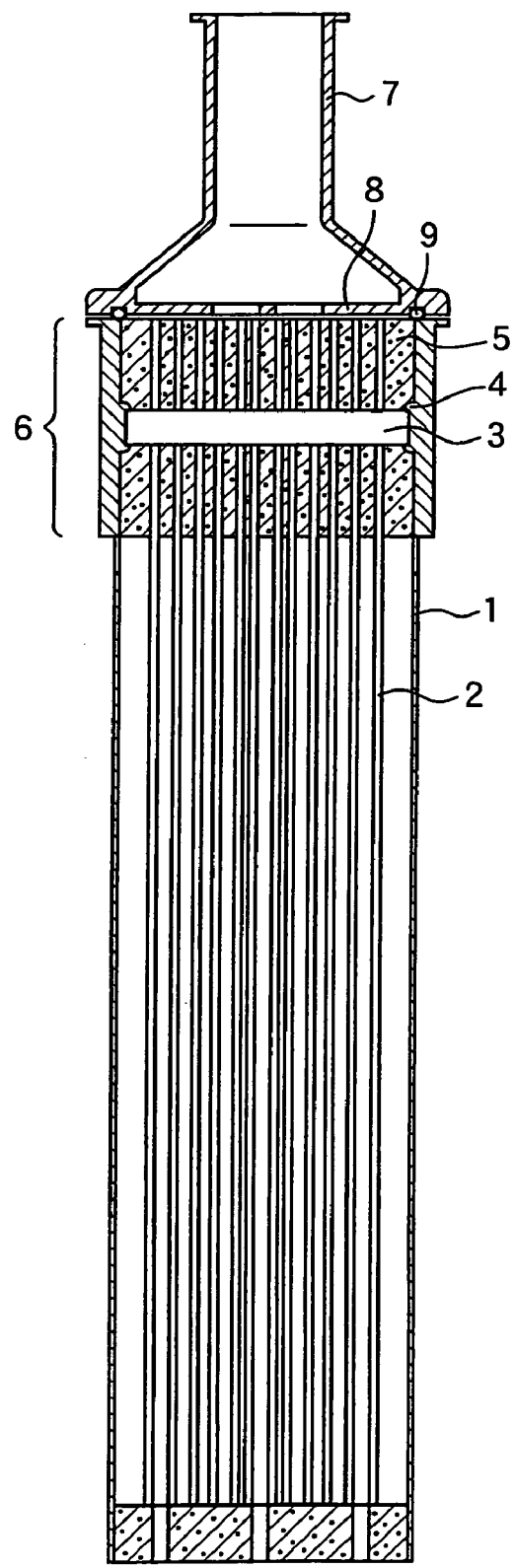

F I G. 5
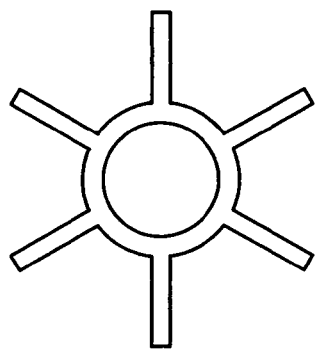
F I G. 6
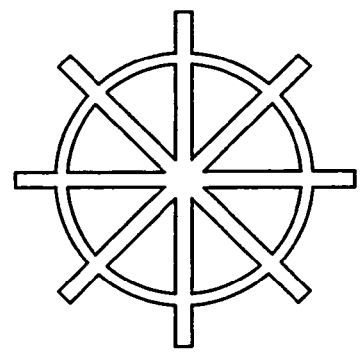
F I G. 7
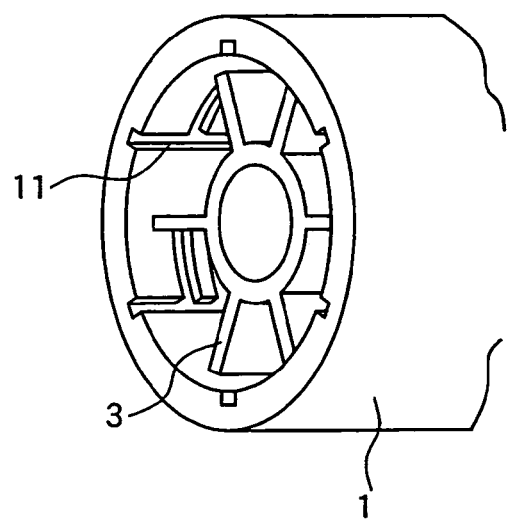

F I G. 8
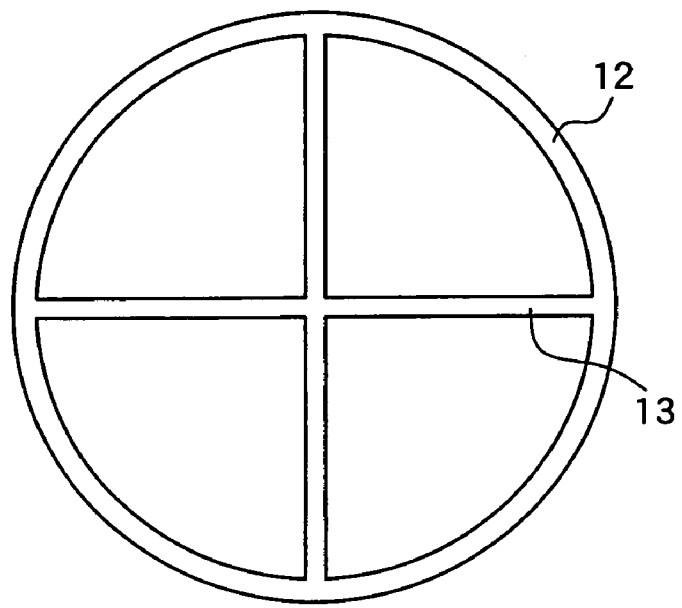
F I G. 9
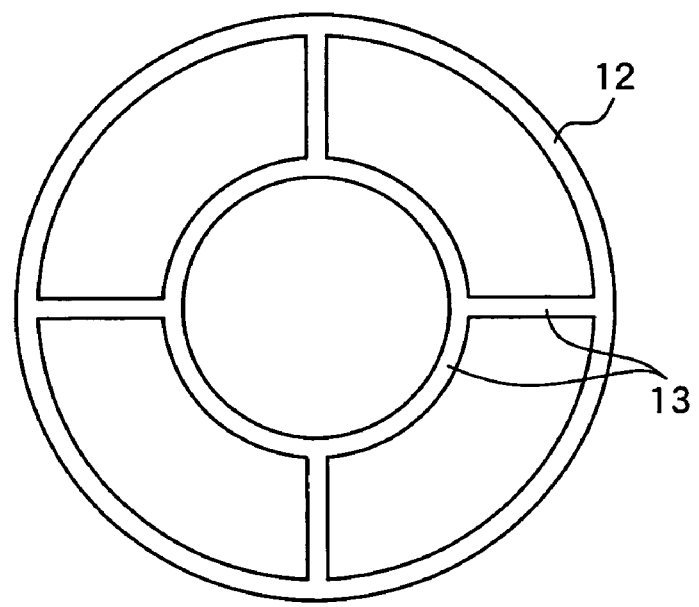

F I G. 1 4
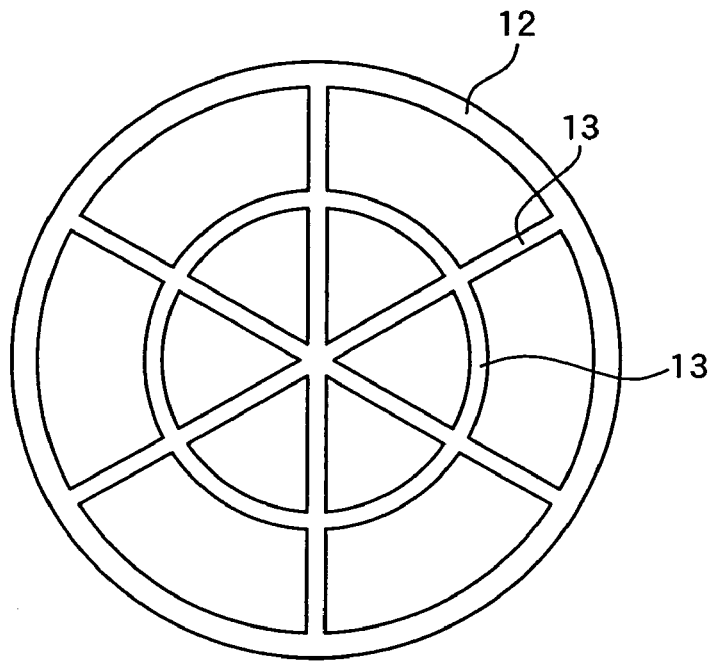
F I G. 1 5
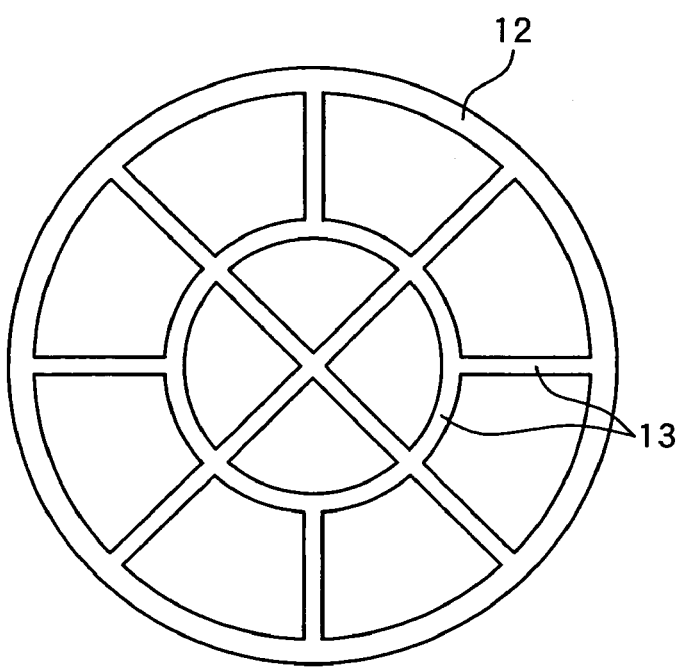

F I G. 2 1
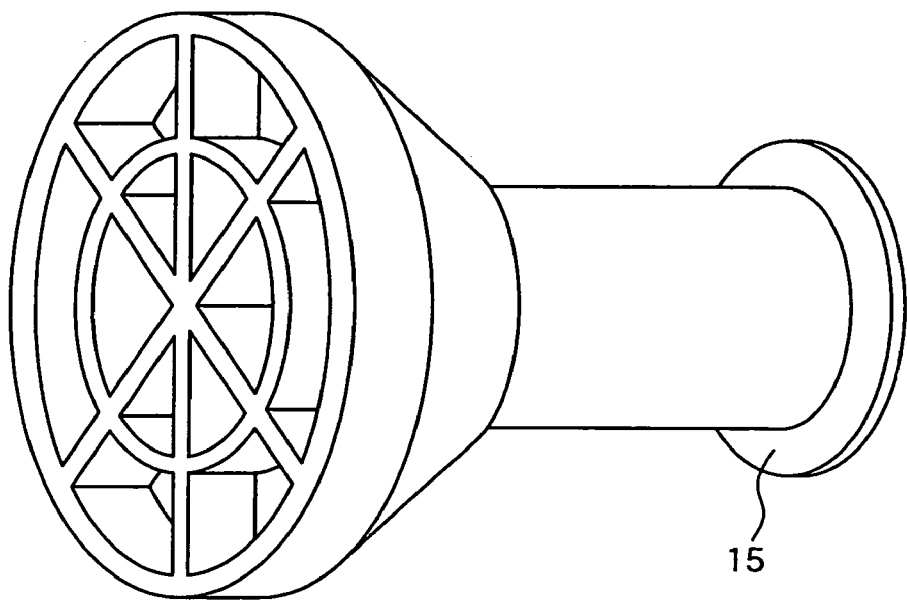
F I G. 2 2
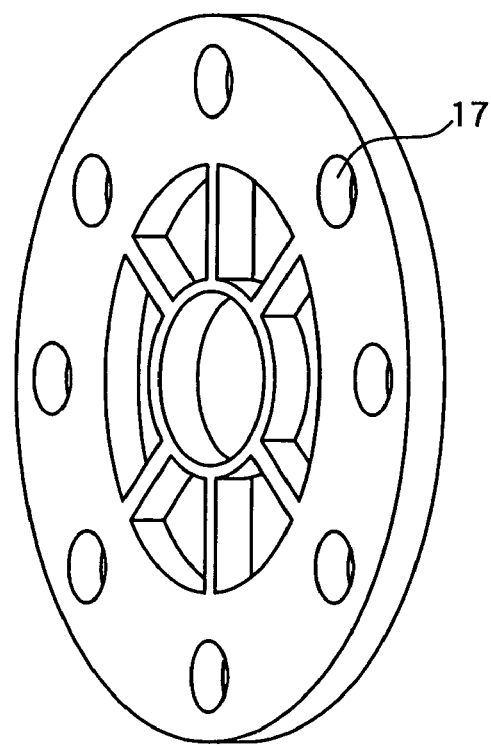

HOLLOW FIBER MEMBRANE MODULE

This application is the national phase under 35 U.S.C. 371 of PCT International Application No. PCT/JP02/11352 which has an International filing date of Oct. 31, 2002, which designated the United States of America.

TECHNICAL FIELD

The present invention relates to a hollow fiber membrane module used in the field of water treatment for tap water such as river water, lakes and marshes water, underground water, and underflow water; secondary treatment waste water; sea water; water for industrial use; process water; or the like. More specifically, the present invention relates to a hollow fiber membrane module in which a potting material for bonding and fixing hollow fiber membranes in a fluid tight manner to a module housing comprises a flexible material.

BACKGROUND ART

A hollow fiber membrane module has been widely used, for instance, for membrane filtration treatments in the production process of various industrial products such as in the production of ultrapure water for washing semiconductors or pyrogen free water; in a closed process wherein electrodeposition paints are collected; enzyme condensation; bacteria removal in fermentation liquid; and removal of turbidity from pure water, waste water or the like. Among the above, in the water treatment field such as treatments for tap water and waste water, a larger scale hollow fiber membrane module has recently been demanded to reduce the treatment costs.

Heretofore, in the hollow fiber membrane modules as described above, epoxy resin has been used as a potting material for bonding and fixing hollow fiber membranes and a module housing. However, there has been a problem that high elasticity of the epoxy resin causes easy breakage of the hollow fiber membranes at the bonding interface with the epoxy resin. Therefore, the technique of preventing breakage of the hollow fiber membrane around the interface by filling the bonding interface between epoxy resin and hollow fiber membranes with flexible resins such as silicone rubber has been adopted. However, this process has the drawback in that the bonding step had to be conducted twice, resulting in inferior economical efficiency. On the other hand, the use of urethane resin as a potting material has been recently proposed (e.g. JP-A-7-47239 and JP-A-7-148421). For example, JP-A-7-47239 discloses that urethane resin prepared by curing prepolymers having an isocyanate end group obtained from diphenyl methane diisocyanate and polyoxy tetramethylene glycol (hereinafter referred to as PTMG) and a curing agent comprising PTMG and castor oil or derivative polyol of castor oil has a higher side temperature in the rubber region of more than 100° C. and a storage modulus of the level of $10^7$ N/m$^2$ and a hollow fiber membrane module obtained by using this urethane resin as a potting material can stand continuous filtration of hot water of 90° C. under a differential pressure of 0.2 MPa (200 KPa) for 6 months without leakage.

However, the urethane resin constructed as the above can hardly achieve storage modulus of $10^8$ N/m$^2$ or more. As a result, there are problems, in that potting portion considerably transforms by different pressure and leakage easily occurs when it is adopted for a hollow fiber membrane module having a large diameter.

Furthermore, JP-A-7-148421 discloses the technique for reducing the transformation of potting portions by using a unit filtration element comprising a hollow fiber membrane bundle installed in a fluid-permeable protecting cylindrical tube and a beam having a length extending from the potting portion at one end of the case housing to the potting portion at the other end of the case housing. However, this module construction has the problems of a complex manufacturing process and high costs because of the material for producing the unit filtration element and the beam material and of the processes for assembling these materials.

WO 97/10893 discloses, as a means for preventing transformation of the potting portion and improving durability, a rib fixed directly to the inner wall of housing in the state of being embedded in the potting portion. This document also discloses fixing by welding, fixing by combination of notches, fixing by screwing and integral molding as a means for fixing rib directly to a housing. Moreover, the technology for preventing damage of potting portion or improving the seal property is also disclosed in JP-A-63-171606, JP-A-6-296834 and JP-A-11-300173.

DISCLOSURE OF THE INVENTION

The present invention aims at providing a hollow fiber membrane module which can maintain a practical pressure resistance.

Further, the present invention also aims at providing a large-scale hollow fiber membrane module which can maintain a practical pressure resistance and is capable of reducing breakage of hollow fiber membranes at the interface of the potting portion without thickening the potting portion.

Moreover, the present invention also aims at improving durability of the potting portion in the hollow fiber membrane module having ozone resistance such as a hollow fiber membrane module using a potting material comprising silicone resin or the like.

The present inventors have made extensive research to achieve the above-mentioned objects and have finally accomplished the present invention.

Namely, the present invention relates to a hollow fiber membrane module comprising a module housing; a hollow fiber membrane bundle comprising a plurality of hollow fiber membranes, at least one end portion of the bundle being fixed on the housing; and a rib or ring, at least one part of the rib or ring being embedded in a potting portion fixing a hollow end portion of the hollow fiber membrane in the housing with a potting material in the state where a hollow portion thereof is open, wherein the potting material is a flexible material, the rib or ring is fixed on an inner wall of the housing or integrally molded with an inner wall of the housing, and the rib or ring is embedded in the potting portion without directly contacting the hollow fiber membrane.

Moreover, the present invention encompasses an external pressure filtration method comprising supplying a raw water from an outer surface side of a hollow fiber membrane bundle and collecting a penetration water from the inner surface side of the bundle by using the above-mentioned hollow fiber membrane module.

BRIEF DESCRIPTION OF THE DRAWINGS

FIG. 1 is a longitudinal sectional view showing an example of the hollow fiber membrane module of the present invention;

FIG. 5 is a sectional view showing an example of the rib used in the present invention;

FIG. 6 is a sectional view showing an example of the rib used in the present invention;

FIG. 7 is a perspective view showing an example of the rib fixed on the inner wall of the housing by combination of notches;

FIG. 8 is a sectional view showing an example of the fixing device used in the present invention;

FIG. 9 is a sectional view showing an example of the fixing device used in the present invention;

FIG. 14 is a sectional view showing an example of the fixing device used in the present invention;

FIG. 15 is a sectional view showing an example of the fixing device used in the present invention;

FIG. 21 is a perspective view showing an example of the integral molding of cap and fixing device used in the present invention;

FIG. 22 is a perspective view showing an example of the integral molding of a flange with holes for bolts and a fixing device used in the present invention;

BEST MODE FOR CARRYING OUT THE INVENTION

Figure 2:
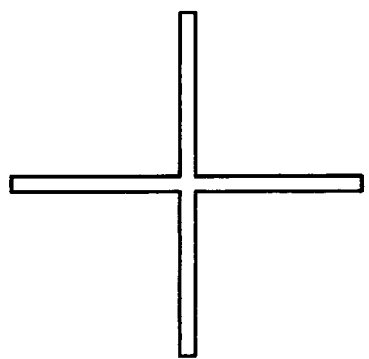
FIG. 2 is a sectional view showing an example of the rib used in the present invention.
Figure 3:
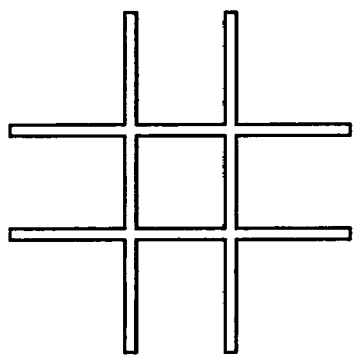
FIG. 3 is a sectional view showing an example of the rib used in the present invention.
Figure 4:
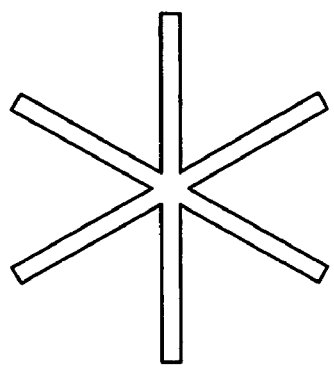
FIG. 4 is a sectional view showing an example of the rib used in the present invention.
Figure 10:
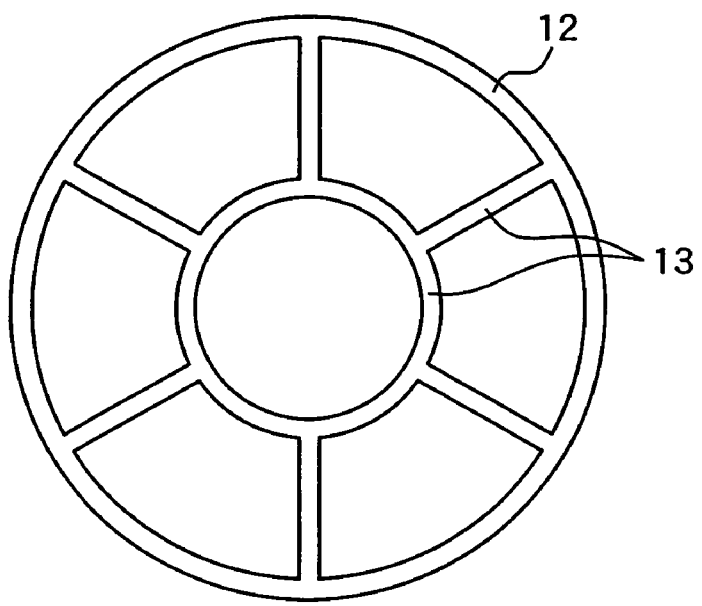
FIG. 10 is a sectional view showing an example of the fixing device used in the present invention.
Figure 11:
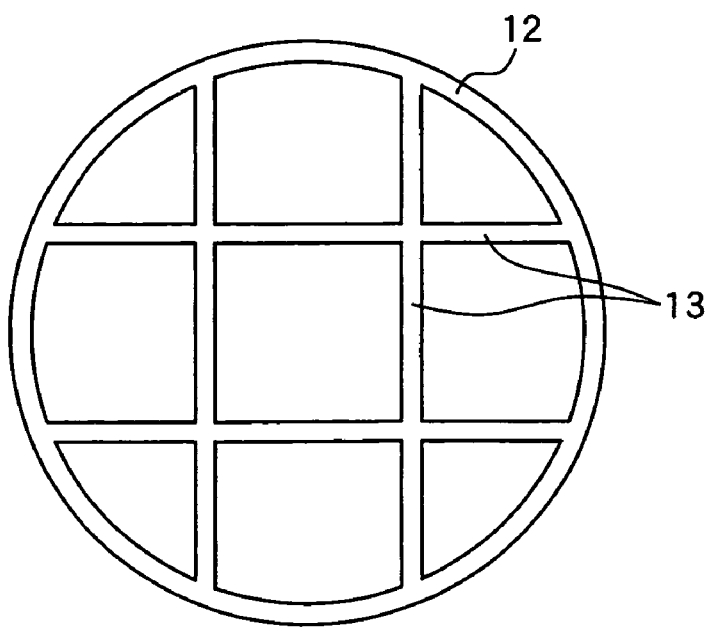
FIG. 11 is a sectional view showing an example of the fixing device used in the present invention.
Figure 12:
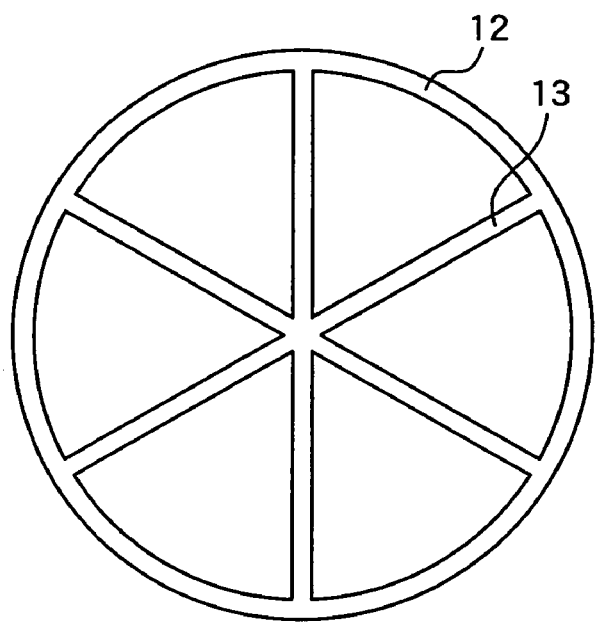
FIG. 12 is a sectional view showing an example of the fixing device used in the present invention.
Figure 13:
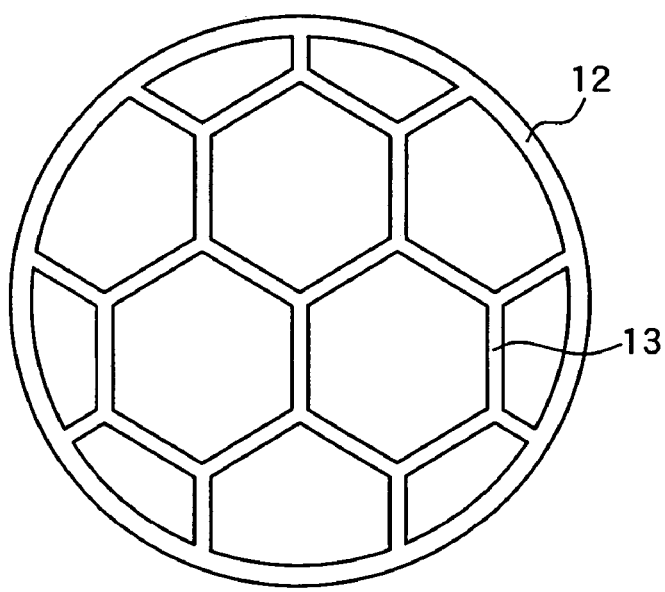
FIG. 13 is a sectional view showing an example of the fixing device used in the present invention.

FIG. 1 is a schematic view showing an example of the hollow fiber membrane module (hereinafter simply referred to as module) of the present invention. As shown in FIG. 1, the hollow fiber membrane module of the present invention comprises a module housing 1, a hollow fiber membrane bundle comprising a plurality of hollow fiber membranes 2, and a rib 3 and/or a ring 4, wherein either or both of the open hollow end portions of the hollow fiber membrane bundle is/are fixed on the module housing 1 by a potting material 5. FIG. 1 shows an example of the module in which a fixing device 8 molded integrally with a cap 7 is arranged through an O-ring 9 and fixed by screwing cap nuts (not shown in FIG. 1) on the outside (upper side) of the end face of the potting portion 6 where the hollow portion of the hollow fiber membrane is open.

The module housing indicates a module case or a cartridge case directly contacting the potting portion. Examples of the material of housing includes polysulfone, polyether sulfone, polypropylene, ABS resin, AS resin, polystyrene, polyvinyl chloride, polyvinylidene fluoride, polytetrafluoroethylene, tetrafluoroethylene-perfluoroalykyl vinyl ether copolymer resin, ethylene-tetrafluoroethylene copolymer resin, tetrafluoroethylene-hexafluoropropylene copolymer resin, polycarbonate, polyether ketones, polyphenylene ether, polyphenylene sulfide, and polymer compositions thereof incorporating glass fiber, carbon fiber, silica fine powder, carbon fine powder or the like, and further includes metals such as stainless steel, aluminum alloy and titanium. Although the housing is not limited in size, the present invention particularly shows remarkable effects when the housing has a large diameter, e.g., outer diameter of 80 to 400 mm. The thickness of the housing is not limited and can be selected appropriately according to the used water pressure of the module.

The present invention comprises a rib 3 and/or a ring 4 embedded in the potting portion 6 as shown in FIG. 1 in order to restrain transformation of the potting portion 6 or maintain durability.

The rib preferably has a cross-section perpendicular to the longitudinal direction of the hollow fiber membrane module in a shape selected from the group consisting of a cross shape, a lattice shape, a radial shape and a combined shape of cross shape, radial shape and circular shape as shown in FIGS. 2 to 6 from the viewpoint of uniform support of the potting portion and uniform installation of the hollow fiber membranes without causing an unnecessary decrease in the number of hollow fiber membranes installed.

The rib or ring is embedded in the potting portion fixing the end portion of the hollow fiber membranes with a potting material in the state where a hollow portion thereof is open without directly contacting the hollow fiber membranes from the viewpoint of durability of the potting portion. The term "embedded" herein includes a case where one or whole part of the rib or ring is embedded in the potting portion. It is preferred that the whole part of the rib or ring is embedded in the potting portion in order to inhibit damage of the cutting device caused by the rib when the end portion of the hollow fiber membrane is cut to open the hollow portion thereof, or to inhibit the breakage of the hollow fiber membrane caused by horizontal vibration of the hollow fiber membranes during the filtration operation. Accessories can be optionally attached to the rib or ring according to usage. For instance, a hook part for hanging a module can be arranged in the center of the rib.

The rib or ring is embedded in the potting portion without directly contacting the hollow fiber membrane. The potting portion should have chemical resistance at a similar level to the hollow fiber membranes or housing. A material of the potting port ion which exhibits sufficient chemical resistance in a mass form sometimes exhibits extremely inferior durability in a thin film form. Therefore, the rib or ring should not contact the hollow fiber membrane directly. The present invention includes a module having a rib but not a ring, a module having a ring but not a rib, and a module having both a rib and a ring. In the case of a module having both a ring and a rib, it is not necessary that both rib and ring are embedded without directly contacting the hollow fiber membranes, and it is sufficient enough that either of rib and ring is embedded without directly contacting the hollow fiber membranes. It is preferred that both rib and ring are embedded without directly contacting the hollow fiber membranes from the viewpoint of the durability of the potting portion.

Although the distance between the rib or ring and the hollow fiber membrane is not limited, the minimum distance is preferably 1 mm or more, more preferably 1.5 mm or more, and yet more preferably 2 mm or more. The maximum distance between the rib or ring and the closest hollow fiber membrane to the rib or ring is preferably 10 mm or less, more preferably 5 mm or less from the viewpoint of securing the number of hollow fiber membranes installed in the module. The distance between the rib or ring and the closest hollow fiber membrane to the rib or ring is preferably 1 to 10 mm, more preferably 1.5 to 10 mm, even more preferably 2 to 10 mm, and most preferably 2 to 5 mm.

It is preferred that a filling layer consisting of the potting material and having a thickness of at least 1 mm is laid between the rib or ring and the hollow fiber membrane from the viewpoint of the durability of the potting material, though a layer consisting of other materials can lie therebetween for the purpose of maintaining a certain distance or more. The thickness of the filling layer is preferably 1.5 mm or more, more preferably 2 mm or more. Although the maximum thickness of the filling layer is not particularly limited, it is preferably 10 mm or less, more preferably 5 mm or less from the viewpoint of securing the number of hollow fiber membranes installed in the module. The range of the thickness of the filling layer is preferably 1 to 10 mm, more preferably 1.5 to 10 mm, even more preferably 2 to 10 mm, and most preferably 2 to 5 mm.

Examples of means for preventing the direct contact of the rib or ring and the hollow fiber membrane include (a) a method in which hollow fiber membranes are bonded and fixed to each other by the same material as the potting material in advance and then the bonded and fixed hollow fiber membrane bundle is installed and set in the housing having a rib and/or ring fixed thereon, (b) a method in which a rib and/or ring is pre-coated with the same material as the potting material prior to installing the hollow fiber membrane bundle in the housing, (c) a method in which hollow fiber membranes are bundled by a ring-shaped tool comprising the same material as the potting material and then installed and set in a housing having a rib and/or ring fixed thereon, or the like.

The method for fixing the rib on the inner wall of the housing is not particularly limited. For instance, the rib may be either fixed directly on the inner wall of the housing by welding, combination of notches or screwing, or molded integrally with the inner wall of the housing. FIG. 7 shows an example of the case of fixing the rib 3 and the inner wall of the housing 1 by combination of the notches 11. As shown in FIG. 1, the rib 3 may be fixed on the inner wall of the housing 1 through the ring 4 as described below. In this case, the rib may be either fixed directly on the inner wall of the ring or molded integrally with the ring. The rib may be fixed directly on the inner wall of the ring by welding, combination of notches or screwing. Moreover, the rib, the ring and the inner wall of the housing may be molded integrally. Among the above, it is particularly preferred that the ring and the housing are molded integrally and then the pre-coated rib is fixed by combination of notches or screwing from the viewpoint of reduction in the number of parts, and easiness of pre-coating of the rib and assembling.

The module of the present invention can have a ring instead of or together with the above-mentioned rib. The ring has a function of supporting the potting portion transforming upon filtration or back wash and a function of distributing shearing stress acting on the potting portion, specifically on the boundary face of the inner wall of the housing and the potting portion. By arranging the ring, the module of the present invention can have a potting portion structure exhibiting higher durability.

Although the method for fixing the ring on the inner wall of the housing is not particularly limited, the ring is preferably fixed directly on the inner wall of the housing by welding, combination of notches, screwing, pinning or the like, or is molded integrally with the inner wall of the housing.

It is preferred that one or two rings are arranged per potting portion from the viewpoint of keeping the potting portion fluid tight. The ring is preferably arranged so that its ring-shaped base or upper face is parallel to the end face of the potting portion from the viewpoint of restraining generation of air pockets upon casting and maintaining the function of supporting the potting portion.

Figure 23:
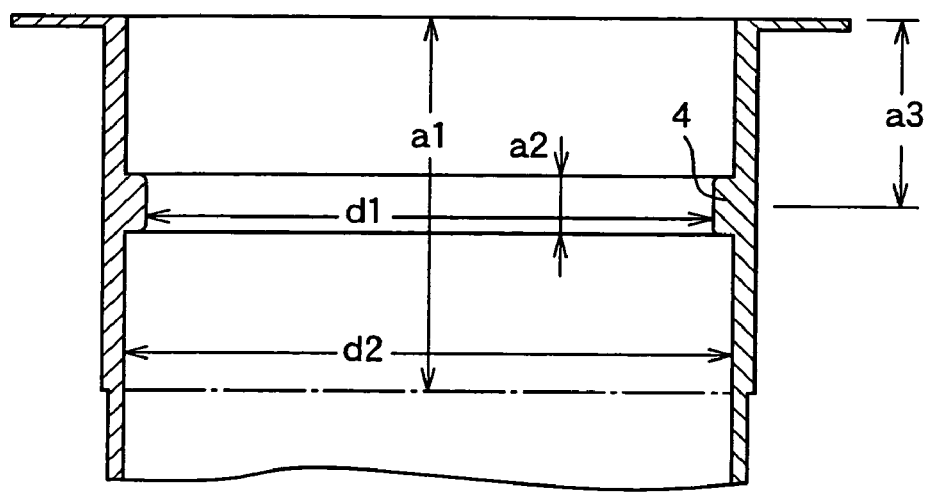
FIG. 23 is a schematic sectional view showing an example of the inner wall of housing of the module in which one ring and an inner wall of housing are molded integrally.
Figure 24:
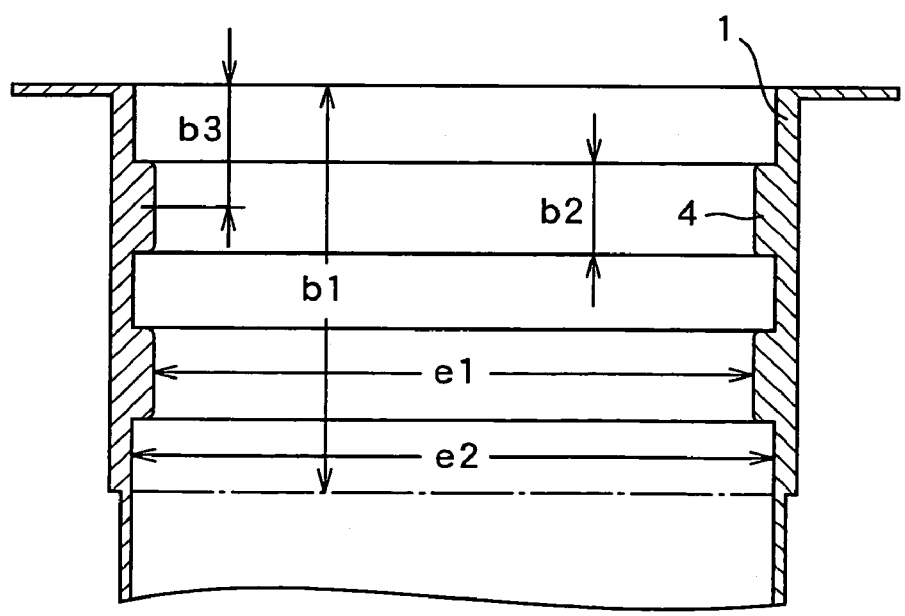
FIG. 24 is a schematic sectional view showing an example of the inner wall of housing of the module in which two rings and an inner wall of the housing are molded integrally.

The external angle portion of the ring is preferably subjected to R-processing (processing for rounding the corner) from the viewpoint of distributing the stress applied on the potting portion in the vicinity of the ring. Examples (schematic longitudinal sectional views) of the inner wall of the housing of the module which is molded integrally with a R-processed ring are shown in FIGS. 23 and 24. Herein, the R-value (radius of rounding corner) of R-processing applied to the external angle portion of the ring is preferably 20 to 80%, more preferably 40 to 60%, of the width of the projection of the ring {(inner diameter of the housing inner diameter of the ring)/2} from the viewpoint of securing the effects of distributing stress and supporting the potting portion.

Although the location of the ring is not particularly limited, the ring is preferably arranged in the center part of the potting thickness as shown in FIG. 23, when just one ring is arranged in the potting portion. In the case of arranging two rings in the potting portion, the rings are preferably arranged at equal intervals as shown in FIG. 24. Although FIG. 24 shows an example in which the two rings have the same thickness, the thickness may be different. The relation that (a1)=(a3)×2 is preferably fulfilled in FIG. 23, and the relation that (b1)=(b3)×3 is preferably fulfilled in FIG. 24. Herein, a3 and b3 each represents a distance from the outer end face of the potting portion to the center of the ring in the thickness direction, and a1 and b1 each represents an entire thickness of the potting portion. As to the relation between the inner diameter of the ring and that of the housing, the ratio of the inner diameter of the housing to that of the ring, i.e., the value of d2/d1 in FIG. 23 and the value of e2/e1 in FIG. 24, is preferably 1.05 to 1.33 from the viewpoint of distributing stress and securing the number of hollow fiber membranes installed. Moreover, the entire thickness of the ring, which is the thickness of the ring in the case of arranging a ring in one place (a2 in FIG. 23) and a total thickness of the rings in the case of arranging rings in two places (b2×2 in FIG. 24), is preferably 15 to 75% of the thickness of the potting portion from the viewpoint of supporting the potting portion and distributing stress.

In the hollow fiber membrane module of the present invention, as shown in FIG. 1, it is preferred that a fixing device 8 is arranged outside the end face of the potting portion 6 on the side of the hollow fiber membrane with open hollow portion substantially without closing the end of the openings of the hollow fiber membrane from the viewpoint of restraining the transformation of the potting portion. Particularly, the remarkable effects are achieved by arranging the fixing device in the case of a hollow fiber module used for so-called external pressure filtration, in which raw water is supplied from the outer surface of the hollow fiber membrane and filtrate water penetrates toward the inner surface side thereof. In the external pressure filtration, pressure is applied from the side where the hollow fiber membrane exists toward the outer end face of the potting portion upon supplying raw water. Although the pressure is applied by filtrate water from the outer end face of the potting portion toward the side where the hollow fiber membrane exists at the time of back wash, the duration of back wash is very short compared to the filtration duration in the actual operation. Therefore, the stress applied to the potting portion almost always becomes the stress at filtration, namely, the stress from the side where the hollow fiber membrane exists toward the outer end face of the potting portion. For this reason, means for giving force against the transformation stress in the direction toward the outer end face of the potting portion (fixing device) becomes an effective means for restraining the transformation of the potting portion.

The fixing device comprises a frame portion and a partition portion. The filtration water can be collected through the space formed by a frame portion and partition portions or through the space formed by partition portions. The transformation of the potting portion is restrained by the frame portion and the partition portions. The fixing device is not limited in shape. From the viewpoint of inhibiting the potting portion from stripping off from the inner wall of the housing and distributing stress applied to the potting portion, the cross-section of the frame portion 12 perpendicular to the longitudinal direction of the hollow fiber membrane module is preferably in a circular shape, and that of the partition portion 13 perpendicular to the longitudinal direction of the hollow fiber membrane module is preferably in any one of cross shape, lattice shape, radial shape, honeycomb shape and combined shape of cross or radial shape and circular shape as shown in FIGS. 8 to 15.

The material of the fixing device is preferably a material difficult to transform by external pressure. Examples of the material constructing the fixing device include polysulfone, polyether sulfone, polypropylene, ABS resin, AS resin, polystyrene, polyvinyl chloride, polyvinylidene fluoride, polytetrafluoroethylene, tetrafluoroethylene-perfluoroalkyl vinyl ether copolymer resin, ethylene-tetrafluoroethylene copolymer resin, tetrafluoroethylene-hexafluoropropylene copolymer resin, polycarbonate, polyether ketones, polyphenylene ether, polyphenylene sulfide, epoxy resin not having rubber-like elasticity and the like, and mixtures thereof; and plastics thereof incorporating glass fiber, carbon fiber, silica fine powder, carbon fine powder or the like. Further, they include metals such as stainless steel, aluminum alloy and titanium.

Figure 16A:
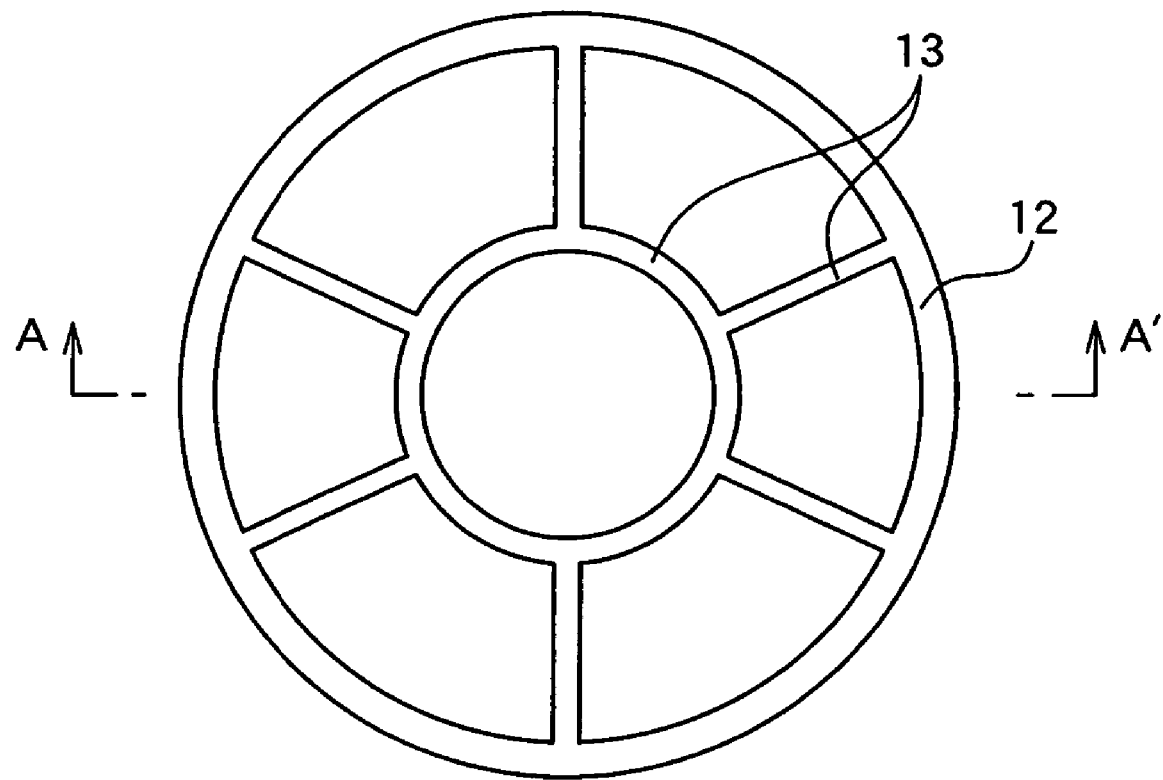
FIG. 16(a) is a sectional view showing an example of the fixing device applied by R-processing.
Figure 16B:
FIG. 16(b) is the A–A' sectional view of FIG. 16(a)

The fixing device is preferably arranged substantially without closing the end portion of the openings of the hollow fiber membrane. There are some cases where transformation of the potting portion causes the outer end face thereof to transform and contact the fixing device. In this case, it is preferred that R-processing is applied to the external angle portion of the fixing device at the part where contact with the outer end face of the potting portion may occur in order to prevent concentration of the stress caused by the transformation of the potting portion in the vicinity of the interface with the fixing device. Examples of such a fixing device are shown in FIGS. 16(a) and 16(b). FIG. 16(b) is an A–A' sectional view of the fixing device shown in FIG. 16(a), and the lower side of the sectional view may contact the outer end face of the potting portion of the hollow fiber membrane module.

Another example of means for arranging the fixing device substantially without closing the end of the openings of the hollow fiber membrane includes a method for arranging the fixing device on the outer end face of the potting portion through a plastic or metal net. This method is more preferred in that a net arranged between the outer end face of the potting portion and the fixing device divides the transformation region of the potting port ion into smaller areas and reduces the substantial transformation of the potting portion.

Figure 17:
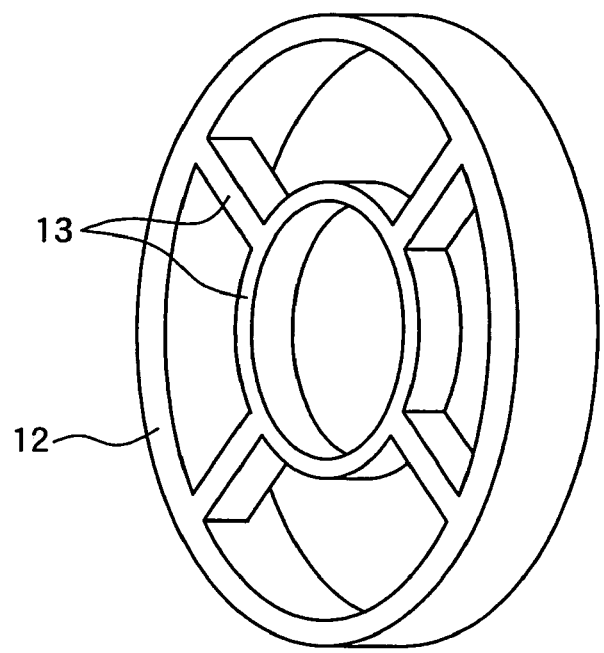
FIG. 17 is a perspective view showing an example of the fixing device used in the present invention.
Figure 18:
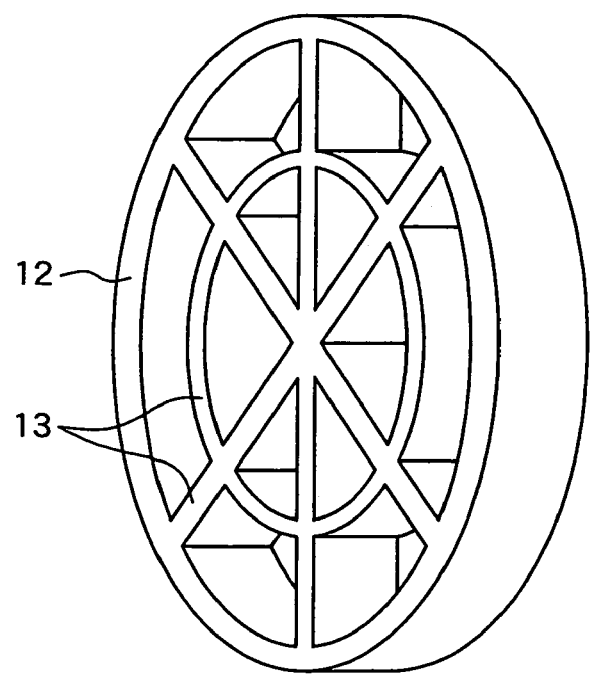
FIG. 18 is a perspective view showing an example of the fixing device used in the present invention.
Figure 19:
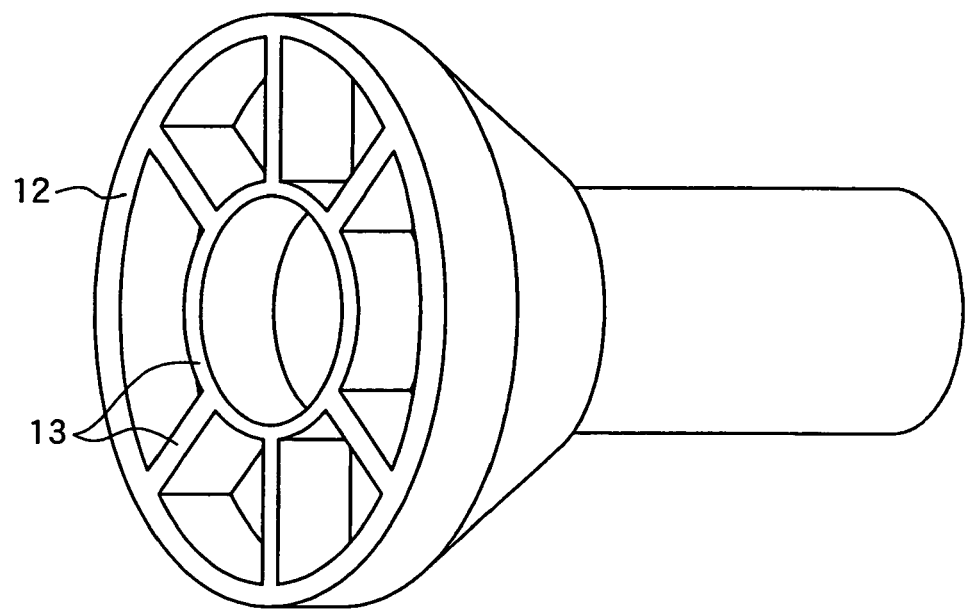
FIG. 19 is a perspective view showing an example of the integral molding of cap and fixing device used in the present invention.
Figure 20:
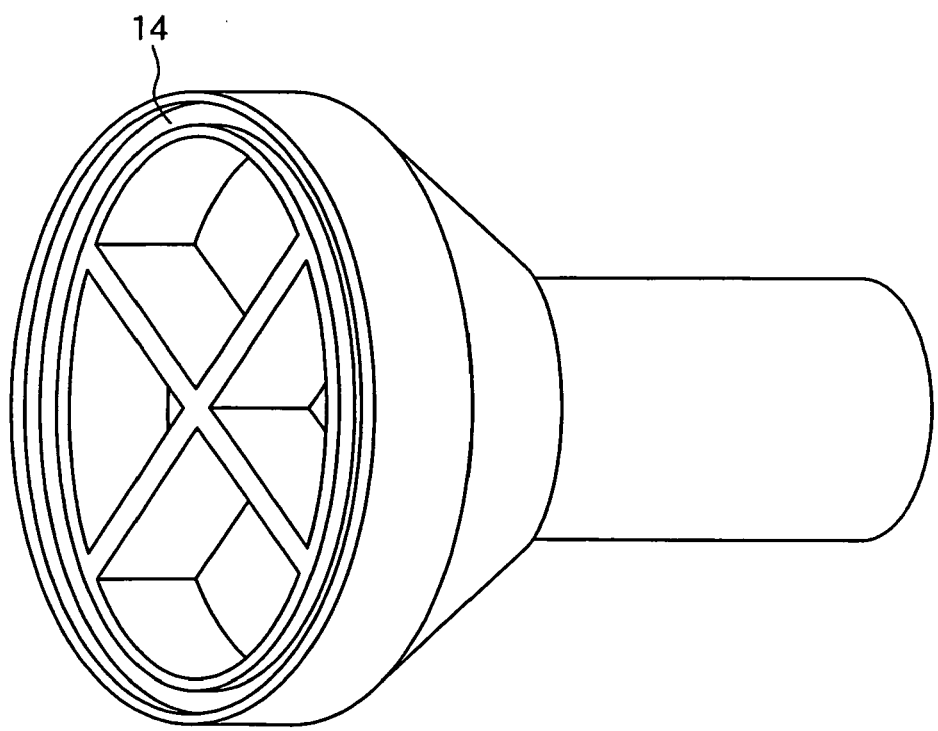
FIG. 20 is a perspective view showing an example of the integral molding of cap and fixing device used in the present invention.

When the hollow fiber membrane module is connected directly to the piping of the filtrate water, the fixing device can be fixed on the cap joining the body of the hollow fiber membrane module and the connecting piping. Depending on the materials of a cap and a fixing device, the fixing device can be fixed on the cap by, for example, a method comprising integrating the cap and the fixing device by welding fixing, fusion fixing or the like, a method comprising molding the fixing device and the cap integrally, and a method comprising sandwiching the fixing device by the body of the hollow fiber membrane module and the cap. Examples (perspective views) of the fixing device sandwiched by the hollow fiber membrane module and the cap for use are shown in FIGS. 17 and 18. On the fixing device, a device for collecting the filtered water can be arranged. Examples (perspective views) of the integrated fixing device and cap are shown in FIGS. 19 to 21. As shown in FIG. 19, the water-collecting device on the cap can be equipped with a connecting piping connecting an operation apparatus and the water-collecting device. As shown in FIG. 21, a means 15 for fixing on the connecting piping can be arranged on the cap.

When the hollow fiber membrane cartridge is installed in a tank equipped with a tube sheet, a similar fixing method to the above-mentioned fixing method of cap can be adopted and it is also possible to impart a function for fixing on the tank tube sheet to the fixing device. One example of the fixing device having a function for being arranged and fixing on the tank is shown in FIG. 22. FIG. 22 shows an example (a perspective view) in which a flange having bolt holes 17 and the fixing device are molded integrally. Instead of the flange as shown in FIG. 22, other connecting means or marketed one can be used.

As shown in FIG. 20, an O-ring groove 14 for O-ring seal can be arranged on the fixing device. This groove may be used not only for O-ring but also for sealing materials such as a square ring and other specific flat packing.

The inner wall of the housing preferably does not contact the hollow fiber membrane directly as well as the above-mentioned rib or ring from the viewpoint of restraining considerable decrease in chemical resistance of the potting portion. The distance between the inner wall of the housing and the hollow fiber membrane is preferably 1 mm or more, more preferably 1.5 mm or more, even more preferably 2 mm or more. Moreover, the distance between the inner wall of the housing and the hollow fiber membrane closest to the inner wall of the housing is preferably 1 to 10 mm, more preferably 1.5 mm to 10 mm, even more preferably 1 to 5 mm, most preferably 2 to 5 mm. The method for preventing the direct contact of the inner wall of the housing and the hollow fiber membrane is similar to that for preventing the direct contact of the rib or ring and the hollow fiber membrane as mentioned above. Between the inner wall of the housing and the hollow fiber membrane, a filling layer consisting of potting material and having a thickness of 1 mm or more is preferably arranged. The minimum thickness of the filling layer is more preferably 1.5 mm or more, and even more preferably 2 mm or more. Although the maximum thickness of the filling layer is not limited, the thickness is preferably 10 mm or less, more preferably 5 mm or less from the viewpoint of securing the number of the hollow fiber membranes installed in the module. The range of the thickness of the filling layer is preferably 1 to 10 mm, more preferably 1.5 to 10 mm, and even more preferably 2 to 10 mm, most preferably 2 to 5 mm.

The potting material of the hollow fiber membrane module preferably has JIS-A hardness after curing of 25 to 90 from the viewpoint of reducing the concentration of the stress on the thin film portion foamed in the potting portion and inhibiting breakage of the hollow fiber membrane in the interface of the potting portion. Herein, JIS-A hardness is measured by Durometer hardness test according to Type A Durometer disclosed in JIS-K6253. In the case of a resin of which hardness changes depending on measurement temperature, the hardness indicates a hardness at a temperature where the resin is used.

As the potting material, one or two liquid type thermosetting resins having flexibility after curing can be used. Examples of the potting material include a urethane resin and a silicone resin such as silicone rubber and further a rubber modified epoxy resin obtained by mixing or copolymerizing rubber-like substance and epoxy resin to impart rubber-like elasticity. Among these resins, the silicone resin such as silicone rubber is preferred from the viewpoint of ozone resistance.

The hollow fiber membrane module of the present invention may be a hollow fiber membrane cartridge supported by hanging in either a filtration tank of tank type filtration apparatus or outer case of rack type filtration apparatus. In this case, the same material as the above-mentioned material for the module housing can be used as a material for cartridge itself.

As the hollow fiber membrane, for instance, membranes having a pore diameter in the range of a ultrafiltration membrane (hereinafter referred to as UF membrane) or microfiltration membrane (hereinafter referred to as MF membrane) can be used. In the case of ultrafiltration membrane, a membrane having a fraction molecular weight of 3,000 to 100,000 Dalton is preferred. In the case of the microfiltration membrane, a membrane having an average pore diameter of 0.001 to 1 μm is preferred. Herein, the average pore diameter is measured by an air flow method disclosed in ASTM F-316-86. Further, the hollow fiber membrane preferably has a porosity of 30 to 90%. Herein, the porosity is calculated from a mass of a hollow fiber membrane saturated with water, a simple volume of the hollow fiber membrane (a volume calculated from an inner diameter, outer diameter and length of the hollow fiber membrane) and a specific density of a polymer used.

The material constituting the hollow fiber membrane is not limited as long as it can be used for the above-mentioned UF membrane or MF membrane. For instance, the material for UF membrane includes cellulose such as ethyl cellulose, cellulose acetate, cellulose diacetate and cellulose triacetate; polyamides such as 6-nylon and 6,6-nylon; vinyl alcohol resin; acryl resin such as polyacrylonitrile and polymethyl methacrylate; halogenated resin such as polyvinyl chloride, polyvinylidene fluoride (PVDF); sulfone resin such as polyether sulfone and polysulfone; ether resin such as polyether ketone and polyether ether ketone; and the like. The material for MF membrane includes polyolefins such as polyethylene, polypropylene and polybutene; fluoro resin such as ethylene-tetrafluoroethylene copolymer, polyvinylidene fluoride, tetrafluoroethylene-hexafluoropropylene copolymer and tetrafluoroethylene-perfluoroalkylvinylether copolymer; sulfone resin such as polysulfone and polyether sulfone; vinyl alcohol resin; and the like. Among them, chloro resin and fluoro resin are preferred from the viewpoint of ozone resistance.

The above-mentioned constitution provides the module of the present invention with sufficient pressure resistance without thickening the potting portion. Depending on a diameter of the module, the module exhibits sufficient pressure resistance even when the potting portion has a thickness of 30 to 120 mm.

Figure 25:
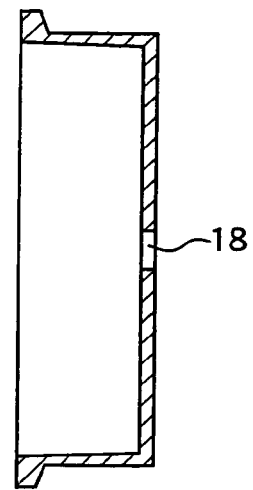
FIG. 25 is a schematic sectional view showing an example of bonding jig used for centrifugal casting of the potting portion on the opening side of the hollow portion of the hollow fiber.
Figure 26:
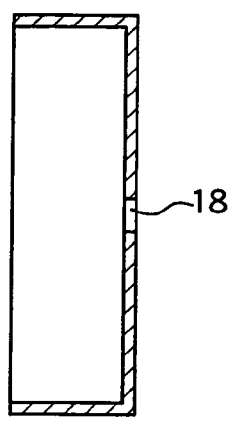
FIG. 26 is a schematic sectional view showing an example of bonding jig used for centrifugal casting of the potting portion on the sealing side of the hollow portion of the hollow fiber.
Figure 27:
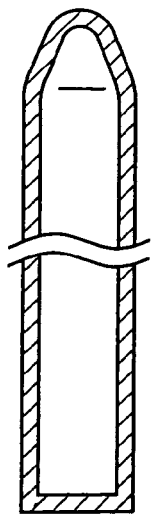
FIG. 27 is a schematic sectional view showing an example of tube-shaped tool for producing openings for supplying-raw water on the sealing side of the hollow portion of the hollow fiber.

The method for producing the hollow fiber membrane module of the present invention comprises, for instance, the following steps. A plurality of the hollow fiber membranes produced by thermally or concentration induced phase separation method, wherein the thermally induced phase separation method includes examples of JP-A-2001-62267, are bundled and installed in a housing having a flange at one side thereof. On the side where the hollow portion of the hollow fiber membranes is to be open, the hollow portion of the end portion is sealed in advance and then a bonding jig having a fixing portion corresponding to the flange as shown in FIG. 25 is arranged. In the case where screw processing is applied to V-band, cramp or housing, the hollow portion of the end portion is fastened and secured by a cap nut to avoid leak of resin. Moreover, on the side where the hollow portion is to be sealed and an inlet for supplying raw water is to be arranged, a plurality of tube-shaped tools as shown in FIG. 27 are arranged in parallel to the hollow fiber membrane in advance and a bonding jig as shown in FIG. 26 is inserted and secured in the piping portion to avoid leaking of the resin. The above-mentioned housing having bonding jigs arranged at both sides is rotated and liquid potting material is injected to both sides by centrifugal force. In FIGS. 25 and 26, numeral 18 represents a resin injection inlet. According to the kind of the potting material used, heating at about 40 to 80° C. is sometimes required. After a prescribed time passes and the potting material is cured, the rotation is stopped and the bonding jigs are detached. On the side where the hollow portion is to be open, the bonded end portion is cut by a rotation round saw or the like to open the hollow portion of the hollow fiber membrane. Further, on the side where the hollow portion is to be sealed and the inlet for supplying raw water is to be open, the external pressure filtration type membrane module of the present invention, which collects filtered water at one side, can be produced by removing tube-shaped tools as shown in FIG. 24.

Although the module of the present invention can be used either for so-called internal pressure type filtration method or for so-called external pressure type filtration method, it can be advantageously used in particular for the external pressure type filtration method in which raw water is supplied from the outer surface side of the hollow membrane bundle and penetrated water is collected from the inner surface side. Further, the module of the present invention has improved chemical resistance and can be advantageously used, for instance, for the filtration method in the presence of ozone, and further for the external pressure type filtration method in the presence of ozone.

Since non-penetrated contaminant accumulates on the outer surface side of the hollow fiber membrane in the external pressure filtration method using a hollow fiber membrane module, the filtration operation can be continued more stably by periodicaily conducting air bubbling, back wash, flushing or plural physical wash. Detailed examples of the external pressure filtration method by hollow fiber membrane module are described in WO 00/63122 or the like.

The module of the present invention demonstrates more effects in the filtration method using ozone, too. As a method for mixing and dissolving ozone to raw water, a method for promoting dissolution of ozone to raw water using an ejector can be applied in addition to a method using a gas scattering tube or U-tube. Further, a method comprising mixing ozone to filtrate water instead of raw water to use water containing ozone as back wash water can become an effective method for decreasing deterioration by ozone oxidation of the potting portion of the hollow fiber membrane module and also decomposing contaminants on the membrane face by axidation. Ozone can be supplied either continuously or intermittently. According to the above-mentioned construction, the module of the present invention can maintain practical pressure resistance over a long period even under a severe condition such as ozone concentration of 0.3 to 3 mg/L.

EXAMPLES

Hereinafter, examples of the present invention are explained referring to Examples. In Examples, JIS-A hardness of the potting material was measured by a Type A Durometer hardness meter of JIS-K6253 (manufactured and sold by Koubunshi Keiki Co., Ltd., Asker A type).

Reference Example 1

A polyurethane resin prepared by mixing C-4403 (trade name) manufactured and sold by Nippon Polyurethane Industry Co., Ltd. as a main agent of urethane resin and N-4221 (trade name) manufactured and sold by the same company as a curing agent at a mass ratio (main/curing) of 63/37 was fed to a flanged housing (inner diameter/outer diameter: 169 mm/183 mm) made of ABS resin in plural times, and left at an ambient temperature of 30° C. for 4 hours to cure. Then, heat settling was conducted at 50° C. for 16 hours to prepare a potting portion having a thickness of 65 mm. Herein, JIS-A hardness after curing of the urethane resin used as the potting material was 95 at 25° C. and 90 at 40° C.

Figure 28:
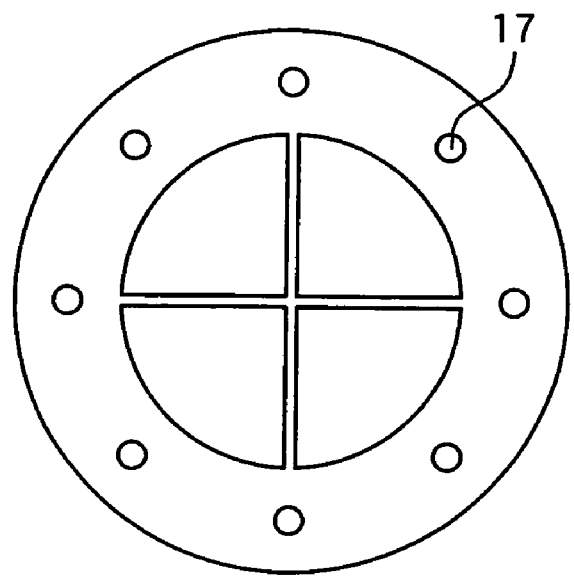
FIG. 28 is a sectional view showing the integral molding of flange and fixing device used in Reference Example 1.

Subsequently, the above-mentioned housing filled with the urethane resin was installed through a flat packing in a cylindrical pressure container made of stainless steel and equipped with a flange having bolt holes. On the flange portion of the housing, a fixing device being molded integrally with a flange having bolt holes and comprising a partition portion having a cross-shaped flat section (FIG. 28 wherein groove for O-ring is omitted) was arranged through the O-ring and secured with blots. Then, the pressure container was hydraulically pressurized from the side where the fixing device was not arranged using warm water having a temperature of 40±1° C. under a pressure of 300 KPa. When the transformation of the potting portion was observed, the farthest portion from the portion supported by the fixing device (frame portion and partition portion) was most largely transformed in the end face of the potting portion and the thickness difference between before and after pressurization (before and after transformation) was 2 mm. The above-mentioned hydraulic pressurization was continued for 240 hours, but no destruction such as cracks of the potting portion was observed.

Reference Example 2

The main agent and curing agent of SU-1760 (trade name) manufactured and sold by Sanyu Rec Co., Ltd. were mixed at a mass ratio (main/curing) of 20/80 and then fed in plural times to a flanged housing (inner diameter/outer diameter: 169 mm/183 mm) made of ABS resin and having a ring (inner diameter: 160 mm, thickness: 15 mm, R-processing: 2 mmR) molded integrally with the housing, as shown in FIG. 23. After leaving at an ambient temperature of 40° C. for 4 hours to cure, heat settling was further conducted at 60° C. for 20 hours to prepare a potting portion 65 mm thick comprising a urethane resin as a potting material. Herein, JIS-A hardness after curing of the urethane resin was 78 at 25° C. and 71 at 60° C.

Figure 29:
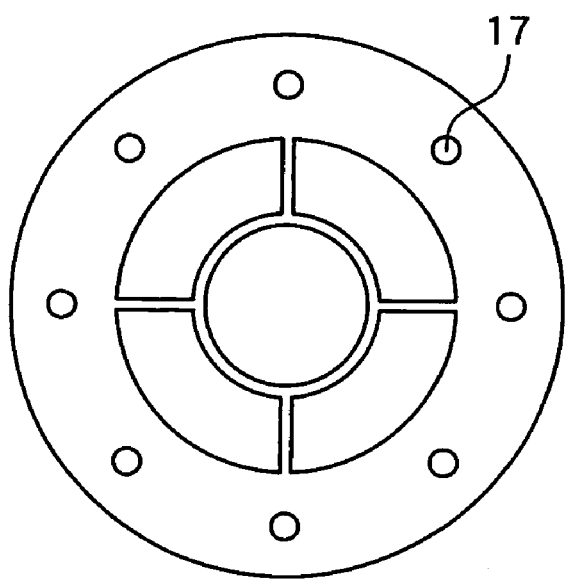
FIG. 29 is a sectional view showing the integral molding of flange and fixing device used in Reference Example 2.

Subsequently, the above-mentioned housing filled with the urethane resin was installed through a flat packing in a cylindrical pressure container made of stainless steel and equipped with a flange having bolt holes. On the flange portion of the housing, a fixing device being equipped with a flange having bolt holes and comprising a partition portion having a flat section of the combined shape of circular shape and cross shape (FIG. 29 wherein groove for O-ring is omitted) was arranged through the O-ring and fixed with blots. Then, the pressure container was hydraulically pressurized from the side where the fixing device was not arranged using warm water having a temperature of 40±1° C. under a pressure of 300 KPa. When the transformation of the potting portion was observed, the center portion surrounded by the central circular partition portion of the fixing device was most largely transformed in the end face of the potting portion and the difference of the thickness before and after pressurization (before and after transformation) was 2 mm. The above-mentioned hydraulic pressurization was continued for 200 hours, but no destruction such as cracks of the potting portion was observed.

Reference Example 3

A potting portion 60 mm thick comprising a silicone rubber as a potting material was prepared by mixing agents A and B of TSE-3337 (trade name) manufactured and sold by GE Toshiba Silicones Co., Ltd. at a mass ratio (agent A/agent B) of 1/1, feeding the mixture to a flanged housing (inner diameter/outer diameter: 157 mm/165 mm) made of SUS-304 and having a ring (inner diameter: 137 mm, thickness: 20 mm, R-processing: 3 mmR), as shown in FIG. 23, fixed on the inner wall of the housing by welding, leaving the housing at an ambient temperature of 60° C. for 5 hours to cure, and further conducting heat settling at 120° C. for 3 hours. Herein, JIS-A hardness after curing of the silicone rubber was 60 at both 25° C. and 60° C.

Figure 30:
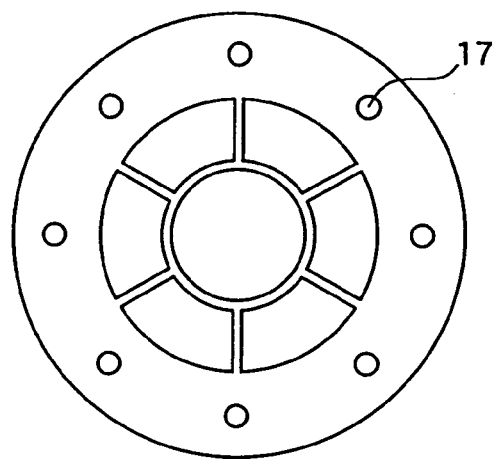
FIG. 30 is a sectional view showing the integral molding of flange and fixing device used in Reference Example 3.

Subsequently, the above-mentioned housing filled with the silicone rubber was installed through a flat packing in a cylindrical pressure container made of stainless steel and equipped with a flange having bolt holes. On the flange portion of the housing, a fixing device being equipped with a flange having bolt holes and comprising a partition portion having a flat section of the combined shape of circular shape and radial shape (FIG. 30 wherein groove for O-ring is omitted) was arranged through the O-ring and secured with blots. Then, the pressure container was hydraulically pressurized from the side where the fixing device was not arranged using warm water having a temperature of 25±2° C. under a pressure of 500 KPa. When the transformation of the potting portion was observed, the end face of the potting portion where the largest transformation was observed was the center of the portion surrounded by the central circular partition portion of the fixing device and the center of the six portions divided by the partition portion extending from the central circle partition portion toward the frame portion and the thickness difference before and after pressurization (before and after transformation) in each portion was 2 mm.

The above-mentioned hydraulic pressurizing was continued for 450 hours, but no destruction such as cracks of the potting portion was observed.

Reference Example 4

A flanged housing having the same structure as in Reference Example 3 was prepared by fixing a ring thereon by welding, and a rib having a flat section of cross shape was fixed on the ring by welding.

Subsequently, a potting portion 60 mm thick comprising a silicone rubber as a potting material was formed by mixing agents A and B of TSE-3337 (trade name) manufactured and sold by GE Toshiba Silicones Co., Ltd. at a mass ratio (agent A/agent B) of 1/1, feeding the mixture to the above-mentioned housing, leaving the housing at an ambient temperature of 60° C. for 5 hours to cure, and further conducting heat settling at 120° C. for 3 hours. Herein, JIS-A hardness after curing of the silicone rubber was 60 at both room temperature and 60° C.

Further, the above-mentioned housing filled with silicone rubber was installed through a flat packing in a cylindrical pressure container made of stainless steel equipped with flange. After arranging a cap on the housing, hydraulic pressurization by water having a temperature of 25±2° C. under a pressure of 500 KPa was repeatedly conducted from both sides of the cap alternately. The above-mentioned hydraulic pressurization was repeated 10,00 0 times, but no destruction such as cracks was observed in the potting portion.

Example 1

Four bundles comprising 1,200 PVDF hollow fiber microfiltration membranes (inner diameter/outer diameter: 0.70/1.25 mm, average pore diameter according to ASTM 316-86: 0.2 μm, porosity: 70%) obtained by the method described in JP-A-2001-62267 were prepared.

Subsequently, a flanged housing 1 (inner diameter/outer diameter: 140/150 mm, length: 1,000 mm) being made of SUS-304 and equipped with an integrally molded ring 4 (inner diameter: 130 mm, thickness: 21 mm, R-processing: 3 mmR), as shown in FIG. 23, was prepared. On the ring 4 of the housing, a rib 3 made of SUS-304, which was pre-coated in 2 mm thick with silicone rubber TSE-3337 (trade name; used after mixing agents A and B at a mass ratio of 1/1) manufactured and sold by GE Toshiba Silicones Co., Ltd. and had a cross-shaped flat section, was fixed by combination of notches.

The above-mentioned four bundles of the hollow fiber membranes were installed in the above-mentioned housing and then collectively secured with a 3 mm thick ring-shaped tool made of TSE-3337. On the side of housing flange, the hollow portion of the hollow fiber membranes was sealed and a bonding jig was attached. On the side where the flange was not arranged, a bonding jig was attached after arranging 37 tube-shaped tools made of polypropylene having an outer diameter of 10 mm.

After the hollow fiber membranes and both end faces of the above-mentioned housing with bonding jigs were fixed by centrifugal casting at an ambient temperature of 60° C. using a potting material of TSE-3337 (trade name; mixing agents A and B at a mass ratio of 1/1), manufactured and sold by GE Toshiba Silicones Co., Ltd., heat settling was conducted at an ambient temperature of 120° C.

Subsequently, the unnecessary potting portion on the flanged side was cut off to open the hollow portion of the hollow fiber membranes 2 and tube-shaped tools on the opposite side were removed to prepare a hollow fiber membrane cartridge collecting water at one end where the hollow portion is sealed and 37 inlets for supplying raw water are open. The thickness of the potting portion 6 of the resultant cartridge was 100 mm on the flanged side and 30 mm on the opposite side.

Herein, JIS-A hardness of silicone rubber of potting material 5 was 60 at both 25° C. and 60° C.

Figure 31:
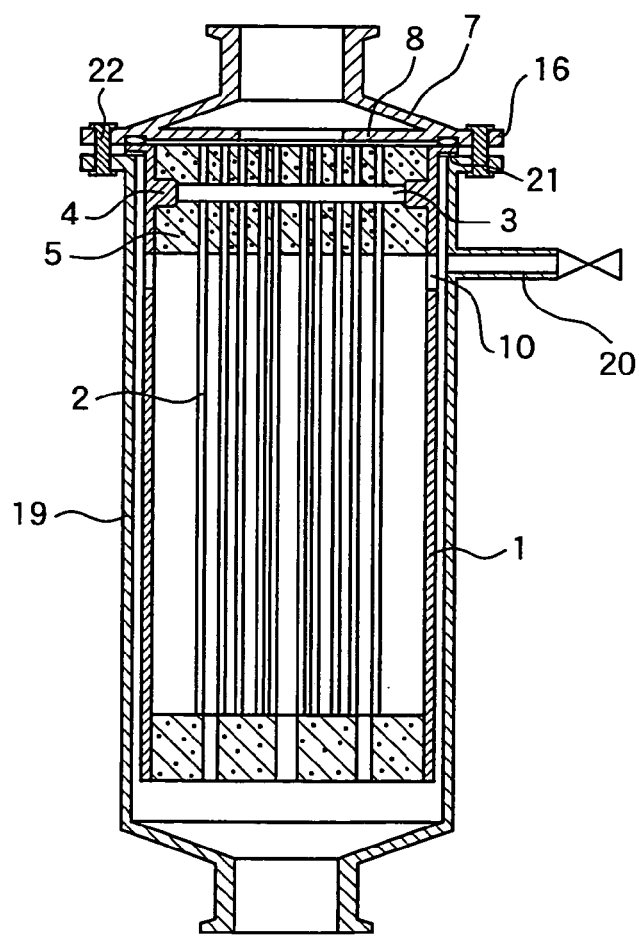
FIG. 31 is a schematic sectional view showing the apparatus used in Examples 1 and 2.

Subsequently, the above-mentioned hollow fiber membrane cartridge was installed in a flanged outer housing 19 (cylindrical pressure container made of stainless steal) through a flat packing 21 with a flanged side up as shown in FIG. 31. In FIG. 31, numeral 10 represents an opening portion for removing both condensate and air in the hollow fiber membrane module, and numeral 20 represents a nozzle for removing air. Further, a molded article prepared by integrally molding a fixing device 8 having partition portion, of which flat section is in a combined shape of circular shape and radial shape (FIG. 10 wherein groove for O-ring is omitted), a flange 16 and a cap 7 was arranged on the flange of the housing 1 through an O-ring 9, and secured with bolt 22. The outer housing 19 was subjected to hydraulic pressurization with warm water at a temperature of 43±2° C. under a pressure of 300 KPa, which was repeatedly conducted from the side of fixing device and the opposite side alternately. In this test, the amount of the ozone gas was adjusted by dosing ozone to the warm water to be supplied with an ejector so that the concentration of the ozone water be 10 mg/L. After repeating the above-mentioned hydraulic pressurization by ozone water (90 sec/cycle) 15,000 times, the potting portion was checked and neither destruction such as crack nor damages of the hollow fiber membrane was observed therein. Further, the repeating pressurization test was restarted. After the pressurization was repeated 50,000 times in total, the potting portion was again checked and neither the destruction such as crack nor damages of the hollow fiber membrane was observed. Further, the evaluation by repeating pressurization was continued. After repeating the pressurization 70,000 times in total, the potting portion was again checked and neither destruction such as crack nor damages of the hollow fiber membrane was observed. The above-mentioned repeating pressurization test corresponds to a filtration operation for four years supposing that the operation is a cycle operation in which back wash is conducted at intervals of 30 minutes. After the test, the module was dismantled and it was observed that the shortest distance between the hollow fiber membrane and the rib was 2 mm and the shortest distance between the hollow fiber membrane and the ring was 3 mm in the potting portion.

Example 2

Four bundles comprising 1,250 PVDF hollow fiber microfiltration membranes (inner diameter/outer diameter: 0.70/1.25 mm, average pore diameter according to ASTM 316-86: 0.2 µm, porosity: 70%) obtained by the method described in JP-A-2001-62267 were prepared.

Subsequently, the above-mentioned four bundles of the hollow fiber membranes were installed in a housing 1 made of SUS-304 (inner diameter/outer diameter: 155/165 mm, length: 1,000 mm) and then secured with a 3 mm thick ring-shaped tool made of silicone rubber XE14-B7179 (trade name; manufactured and sold by GE Toshiba Silicones Co., Ltd.). Herein, this housing had a ring 4 (inner diameter: 145 mm, thickness: 21 mm, R-processing: 3 mmR), as shown in FIG. 23, molded integrally with the housing and a rib 3 having a cross-shaped flat section was arranged on the ring by combination of notches. In addition, the rib 3 was pre-coated in 2 mm thick by silicone rubber obtained by mixing agents A and B of XE14-B7179 (trade name; manufactured and sold by GE Toshiba Silicones Co., Ltd.) at a mass ratio (agent A/agent B) of 1/1.

Further, on the side of the flange of the housing, the hollow portion of the hollow fiber membranes was sealed and a bonding jig was attached. On the side where the flange was not arranged, a bonding jig was attached after arranging 37 tube-shaped tools made of polypropylene having an outer diameter of 10 mm.

The hollow fiber membranes and both ends of the above-mentioned housing with bonding jigs were fixed by centrifugal casting at an ambient temperature of 60° C. using a potting material of silicone rubber obtained by mixing agents A and B of XE14-B7179 (trade name) manufactured and sold by GE Toshiba Silicones Co., Ltd. at a mass ratio (agent A/agent B) of 1/1.

After the above-mentioned hollow fiber membrane cartridge was subjected to the heat settling at an ambient temperature of 120° C., unnecessary potting material on the flanged side was cut off to open the hollow portion of the hollow fiber membranes and tube-shaped tools on the opposite side were removed to prepare a hollow fiber membrane cartridge collecting water at one end where the hollow portion was sealed and 37 inlets for supplying raw water were open. The thickness of the potting portion of the resultant cartridge was 100 mm on the flanged side and 30 mm on the opposite side.

Herein, JIS-A hardness of silicone rubber of potting material was 58 at both 25° C. and 60° C.

Subsequently, the above-mentioned hollow fiber membrane cartridge 1 was installed in a flanged outer housing 19 (cylindrical pressure container made of stainless steal) through a flat packing 21 with a flanged side up as shown in FIG. 31. Further, a molded article prepared by integrally molding a fixing device with partition portion having a flat section in a combined shape of circular shape and cross shape (FIG. 9 wherein groove for O-ring is omitted) a flange and a cap 7 was arranged on the flange of the housing through an O-ring 9 and secured with bolt 22. The outer housing 19 was subjected to hydraulic pressurization with warm water having a temperature of 45±2° C. under pressure of 200 KPa, which was repeatedly conducted from the side of fixing device and the opposite side alternately. In this test, the amount of the ozone gas was adjusted by dosing ozone to the warm water to be supplied with an ejector so that the concentration of the ozone water be 10 mg/L.

After repeating the above-mentioned hydraulic pressurization by ozone water (90 sec/cycle) 20,000 times, the potting portion was checked and neither destruction such as crack nor damages of the hollow fiber membrane was observed. Further, the repeating pressurization test was restarted. After the pressurization was repeated 60,000 times in total, the potting portion was again checked and neither destruction such as crack nor damages of the hollow fiber membrane was observed. Further, the repeating pressurization test was continued. After repeating the pressurization 80,000 times in total, the potting portion was again checked and neither destruction such as crack nor damages of the hollow fiber membrane was observed. The above-mentioned repeating pressurization test corresponds to a filtration operation for 4.5 years supposing that the operation is a cycle operation in which back wash is conducted at intervals of 30 minutes. After the test, the module was dismantled and it was observed that the shortest distance between the hollow fiber membrane and the rib was 2 mm and the shortest distance between the hollow fiber membrane and the ring was 3 mm in the potting portion.

Example 3

Four bundles comprising 1,260 PVDF hollow fiber microfiltration membranes (inner diameter/outer diameter: 0.70/1.25 mm, average pore diameter according to ASTM 316-86: 0.2µm, porosity: 70%) obtained by the method described in JP-A-2001-62267 were prepared.

The above-mentioned four bundles of the hollow fiber membranes were installed in a flanged housing made of SUS-304 (inner diameter/outer diameter: 155/165 mm, length: 1,000 mm). This housing was equipped with a ring 4 (inner diameter: 145 mm, thickness: 21 mm, R-processing: 3 mmR), as shown in FIG. 23, which was molded integrally with the housing, and a rib having a cross shaped section (FIG. 2 wherein groove for O-ring is omitted) was arranged on the ring 4 by combination of notches. In addition, the rib 3 was pre-coated in 2 mm thick with silicone rubber obtained by mixing agents A and B of XE14-B7179 (trade name) manufactured and sold by GE Toshiba Silicones Co., Ltd. at a mass ratio (agent A/agent B) of 1/1.

Further, on the flanged side of the cartridge housing, the hollow portion of the hollow fiber membranes was sealed and then a bonding jig was attached. On the side where the flange was not arranged, a bonding jig was attached after arranging 37 tube-shaped tools made of polypropylene having an outer diameter of 11 mm.

The hollow fiber membranes and both ends of the above-mentioned housing with bonding jigs were fixed by centrifugal casting at an ambient temperature of 60° C. using a potting material of silicone rubber of potting material obtained by mixing agents A and B of XE14-B7179 (trade name) manufactured and sold by GE Toshiba Silicones Co., Ltd. at a mass ratio (agent A/agent B) of 1/1.

After the above-mentioned hollow fiber membrane cartridge was subjected to the post heat treatment at an ambient temperature of 120° C., the unnecessary potting material on the flanged side was cut off to open the hollow portion of the hollow fiber membranes and tube-shaped tools on the opposite side were removed to prepare the hollow fiber membrane cartridge collecting water at one end where the hollow portion was sealed and 37 inlets for supplying raw water were open. The thickness of the potting portion of the resultant cartridge was 110 mm on the flanged side and 30 mm on the opposite side.

Herein, JIS-A hardness after curing of silicone rubber of potting material was 58 at both 25° C. and 60° C.

Figure 32:
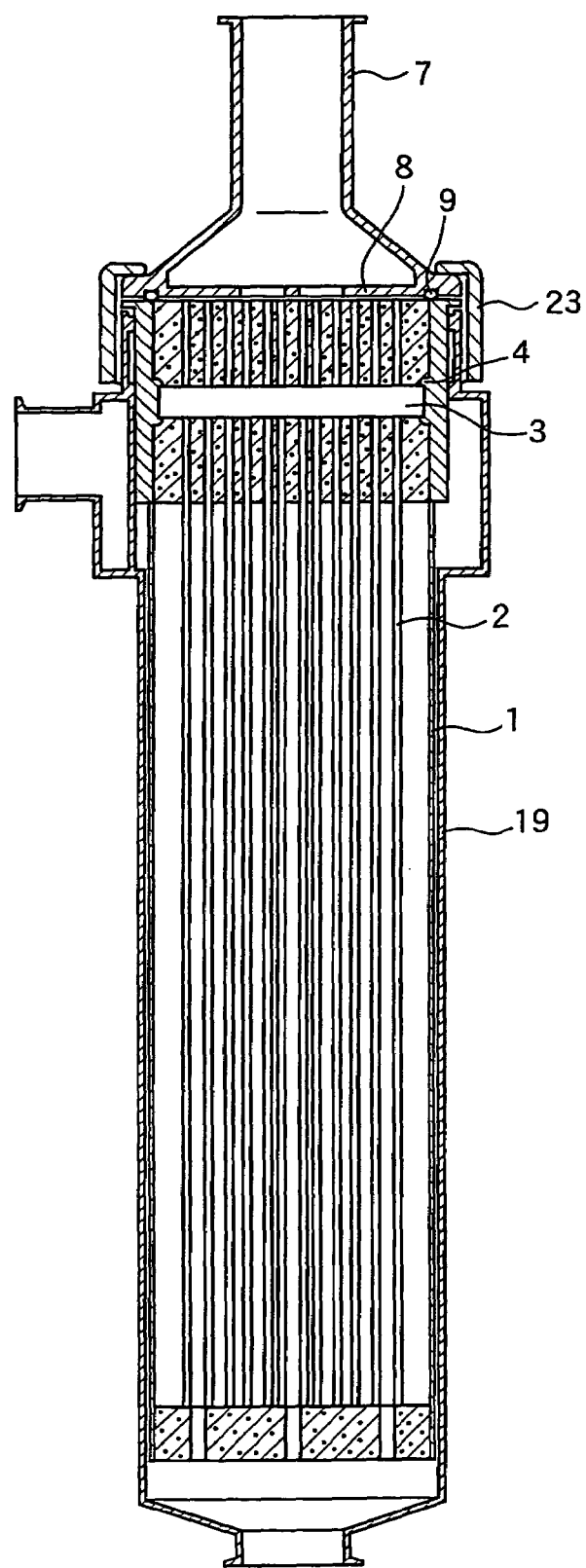
FIG. 32 is a schematic sectional view showing the apparatus used in Example 3.

Subsequently, the above-mentioned hollow fiber membrane cartridge 1 was installed in an outer housing 19 with a screw made of stainless steal through an O-ring 9 with a flanged side up as shown in FIG. 32. Further, a molded article prepared by integrally molding a fixing device with partition portion having a flat section in a combined shape of circular shape and radial shape (FIG. 15 wherein groove for O-ring is omitted) and a cap was-arranged on the housing through the O-ring 9, and then the outer housing 19 and cap 7 were secured with cap nut 23. The outer housing 19 was subjected to hydraulic pressurization with warm water having a temperature of 43±2° C. under pressure of 200 KPa, which was repeatedly conducted from the side of fixing device and the opposite side alternately. In this test, the amount of the ozone gas was adjusted by dosing ozone to the warm water to be supplied with an ejector so that the concentration of the ozone water be 10 mg/L.

After repeating the above-mentioned hydraulic pressurization by ozone water (90 sec/cycle) 50,000 times, the potting portion was checked and neither destruction such as crack nor damages of the hollow fiber membrane was observed. Further, the repeating pressurization test was restarted. After repeating pressurization 100,000 times in total, the potting portion was again checked and neither destruction such as crack nor damages of the hollow fiber membrane was observed. Further, the evaluation by repeating pressurization was continued. After repeating pressurization 160,000 times in total, the potting portion was again checked and neither destruction such as crack nor damages of the hollow fiber membrane was observed. The above-mentioned repeating pressurization test corresponds to a filtration operation for 9.3 years supposing that the operation is a cycle operation in which back wash is conducted at intervals of 30 minutes. After the test, the module was dismantled and it was observed that the shortest distance between the hollow fiber membrane and the rib was 2 mm in the potting portion.

Reference Example 5

A test sample was prepared under the same conditions as in Reference Example 1 except that a fixing device was not arranged, and hydraulic pressurization was conducted under the same conditions as in Reference Example 1. The observation of the transformation of the potting portion shows that the center portion of the potting portion was most largely transformed and the thickness difference between before and after pressurization (before and after transformation) was 8 mm. Continuing the above-mentioned hydraulic pressurization, cohesive destruction along the outer peripheral portion of the potting portion and leakage of water occurred 11 hours after the operation started so that the evaluation was stopped.

Reference Example 6

A test sample was prepared under the same conditions as in Reference Example 2 except that a fixing device was not arranged, and hydraulic pressurization was conducted under the same conditions as in Reference Example 2. The observation of the transformation of the potting portion shows that the center portion of the potting portion was most largely transformed and the thickness difference between before and after pressurization (before and after transformation) was 14 mm. Continuing the above-mentioned hydraulic pressurization, the cohesive destruction along the outer peripheral portion of the potting portion and leakage of water occurred 7 hours after the operation started so that the evaluation was stopped.

Reference Example 7

A test sample was prepared under the same conditions as in Reference Example 4 except that neither fixing device nor ring was arranged, and hydraulic pressurization was conducted under the same conditions as in Reference Example 3. The observation of the transformation of the potting portion shows that the center portion of the potting portion was most largely transformed and the thickness difference between before and after pressurization (before and after transformation) was 14 mm.

Further, the repeating pressurization test was conducted by using this sample under the same conditions as in Reference Example 4. In the 3,407th test, the apparatus for repeating pressurization was stopped owing to abnormal flow quantity in the pressurizing pump. When the potting portion of this sample was checked, circular arc-shaped crack was observed inside of the outer peripheral of the potting portion by 8 mm, which caused leakage. Therefore, the evaluation was stopped.

Comparative Example 1

A hollow fiber membrane cartridge was prepared and repeating pressurization by ozone water was conducted under the same conditions as in Example 1 except that none of the ring, fixing device and rib was arranged.

When pressurization was repeated 10,000 times, the observation of the potting portion showed that crack in the potting portion already occurred and air leakage check showed occurrence of leakage.

Comparative Example 2

A hollow fiber membrane cartridge was prepared and repeating pressurization by ozone water was conducted under the same conditions as in Example 2 except that none of the ring, fixing device and rib was arranged.

When the pressurization was repeated 10,000 times, the observation of the potting portion showed that crack in the potting portion already occurred and air leakage check showed occurrence of leakage.

INDUSTRIAL APPLICABILITY

The present invention can provide a module using a flexible potting material in which the transformation of the potting portion upon filtration operation is restrained. Particularly, the present invention can provide a large scale hollow fiber membrane module maintaining practical pressure resistance in which the occurrence of the breakage of the hollow fiber membrane in the interface of the potting portion was restrained without thickening the potting portion. Further, the present invention also can provide a module in which chemical resistance in the potting portion is improved and damage of the membrane in the interface of the potting portion is restrained. The present invention is useful in the field of the water treatment such as treatment of tap water such as river water, lakes and marshes water and underground water and removal of turbidity from the secondary processing waste water, particularly in the field of water treatment using an external pressure filtration membrane module and ozone.

The invention claimed is:

1. A hollow fiber membrane module comprising:
    a module housing;
    a hollow fiber membrane bundle comprising a plurality of hollow fiber membranes, at least one end portion of the bundle being fixed on the housing; and
    a rib and a ring, at least one part of the rib and the ring being embedded in a potting portion fixing the end portion of the hollow fiber membrane in the housing with a potting material in the state where a hollow portion thereof is open,
    wherein the potting material is a flexible material,
    the ring is directly fixed on an inner wall of the housing or integrally molded with an inner wall of the housing,
    the rib is directly fixed on the ring or integrally molded with the ring, and
    the rib and ring are embedded in the potting portion without directly contacting the hollow fiber membrane, and
    the rib has a pre-coating layer consisting of the potting material and having a thickness of at least 1 mm that separates the rib from the hollow fiber membranes.

2. The hollow fiber membrane module according to claim 1, wherein the thickness of the pre-coating layer is not less than 2 mm.

3. The hollow fiber membrane module according to claim 1, wherein a fixing device is arranged outside the end face of the potting portion on the side of openings of the hollow fiber membrane substantially without sealing the end of the openings.

4. The hollow fiber membrane module according to claim 3, wherein the fixing device comprises a frame portion and a partition portion, and the cross-section of the partition portion perpendicular to the longitudinal direction of the hollow fiber membrane module has a shape selected from the group consisting of cross shape, lattice shape, radial shape, honeycomb shape and combined shape of cross or radial shape and circular shape.

5. The hollow fiber membrane module according to claim 3, wherein a groove for an O-ring is arranged on the fixing device.

6. The hollow fiber membrane module according to claim 1, wherein the ring is arranged in parallel to the end face of the potting portion.

7. The hollow fiber membrane module according to claim 1, wherein R-processing is applied to the external angle portion of the ring.

8. The hollow fiber membrane module according to any one of claims 1 and 2 to 7, wherein the potting material has an JIS-A hardness after curing of 25 to 90.

9. The hollow fiber membrane module according to any one of claims 1 and 3 to 7, wherein the hollow fiber membrane is fixed on the housing without directly contacting the inner wall of the housing at the potting portion.

10. The hollow fiber membrane module according to claim 9, wherein the pre-coating layer existing between the inner wall of the housing and the hollow fiber membrane in the potting portion has a thickness of 1 to 10 mm.

11. An external pressure filtration method comprising supplying a raw water from an outer surface of a hollow fiber membrane bundle and collecting a filtered water from an inner surface of the bundle by using the hollow fiber membrane module according to any one of claims 1 and 2 to 7.

* * * * *